United States Patent [19]

Hakuraku et al.

[11] Patent Number: 4,625,519
[45] Date of Patent: Dec. 2, 1986

[54] ROTARY MAGNETIC REFRIGERATOR

[75] Inventors: Yoshinori Hakuraku; Hisanao Ogata, both of Ibaraki, Japan

[73] Assignee: Hitachi, Ltd., Tokyo, Japan

[21] Appl. No.: 724,763

[22] Filed: Apr. 18, 1985

[30] Foreign Application Priority Data

Apr. 20, 1984 [JP] Japan .................................. 59-78407

[51] Int. Cl.$^4$ .................................. F25B 21/02
[52] U.S. Cl. .................................. 62/3
[58] Field of Search .................................. 62/3, 467

[56] References Cited

U.S. PATENT DOCUMENTS

| 4,033,734 | 7/1977 | Steyert, Jr. et al. | 62/3 |
| 4,107,935 | 8/1978 | Steyert, Jr. | 62/3 |

Primary Examiner—Lloyd L. King
Attorney, Agent, or Firm—Antonelli, Terry & Wands

[57] ABSTRACT

A rotary magnetic refrigerator comprising two rotors which are packed with portions of a working substance at equal spacing along the outer circumference thereof, and which are made of a material having a low thermal conductivity, openings that are formed in the outer surfaces of said rotors so as to communicate with a high-temperature cooling medium, housings having cooling portions provided on sides thereof opposite to said openings, means which establishes an intense magnetic field near said openings and which establishes a weak magnetic field near said cooling portions, and means for driving said rotors.

2 Claims, 4 Drawing Figures

ROTARY MAGNETIC REFRIGERATOR

BACKGROUND OF THE INVENTION

The present invention relates to a magnetic refrigerator which produces refrigeration by applying and removing a magnetic field to a working substance for magnetic refrigeration, and particularly to a rotary magnetic refrigerator adapted to produce superfluid helium.

As is well known, the principle of the magnetic refrigerator is based upon the magnetocloric effect of a magnetic material which generates heat when a magnetic field is applied thereto, and which absorbs heat when the magnetic field is removed therefrom. Superfluid helium can be produced by magnetic refrigeration, i.e., by using a rotary magnetic refrigerator. The rotary magnetic refrigerator is effective for solving the problems inherent in the existing rotary and reciprocal refrigerators which have so far been announced as magnetic refrigerators for producing superfluid helium. They, however, still do not utilize effectively the intense magnetic fields established by electromagnets. For instance, the rotary refrigerator disclosed in U.S. Pat. No. 4,033,734 is of a wheel type in which magnetic material is arranged over the entire outer peripheral surface of a pillar. According to this refrigerator, however, when a magnetic material which has a very good heat conductivity, such as gadolinium gallium garnet ($Gd_3Ga_5O_{12}$) is used as the working substance, there are large thermal losses and the efficiency is low because of the heat conduction of the working substance in the circumferential direction.

The refrigerator of the rotary wheel type developed by W. A. Steyert (J. Appl. Phys. 49(3), 1978), on the other hand, has a problem with regard to maintaining seals, since a working fluid is allowed to flow into a rotor. It is also necessary to provide means for circulating the fluid, making the equipment very complex.

In a refrigerator of a reciprocating type in which a magnetic material is reciprocally inserted into an intense magnetic field and is removed therefrom, proposed by R. Beranger et al. (Advances in Cryogenic Engineering, Vol. 27, p. 703, 1982, Plenum Press, New York), a mechanism is needed to convert rotary motion into linear motion, when it is driven by a motor. In addition, when the stroke is large, the construction of the drive portion must be complicated and large.

SUMMARY OF THE INVENTION

The object of the present invention is to provide a rotary magnetic refrigerator which is free from the above problems.

The feature of the present invention resides in that two cylindrical housings are positioned so that openings thereof communicating with a high-temperature cooling medium surface each other, each of the cylindrical housings contains a cylindrical rotor which has a working substance packed into a plurality of portions thereof, an electromagnet is positioned so that it applies an intense magnetic field to the two openings, and the intense magnetic field established by the electromagnet is simultaneously applied to the plurality of working substance portions in the two cylindrical rotors located in the openings communicating with the high-temperature cooling medium.

According to the present invention, the two rotary magnetic refrigerators can be operated by commonly using the intense magnetic field. Namely, the intense magnetic field is efficiently utilized, and the construction of the refrigerator is simplified.

DESCRIPTION OF THE EMBODIMENT

Figure 1:
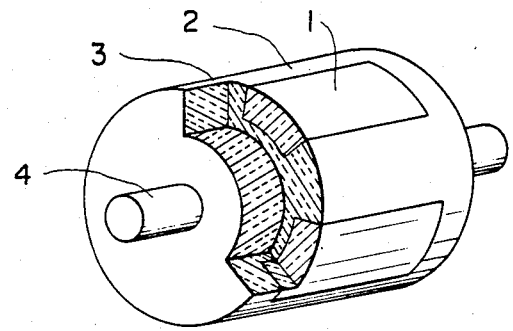
FIG. 1 is a perspective, partially-sectioned view of a cylindrical rotor according to the present invention.
Figure 2:
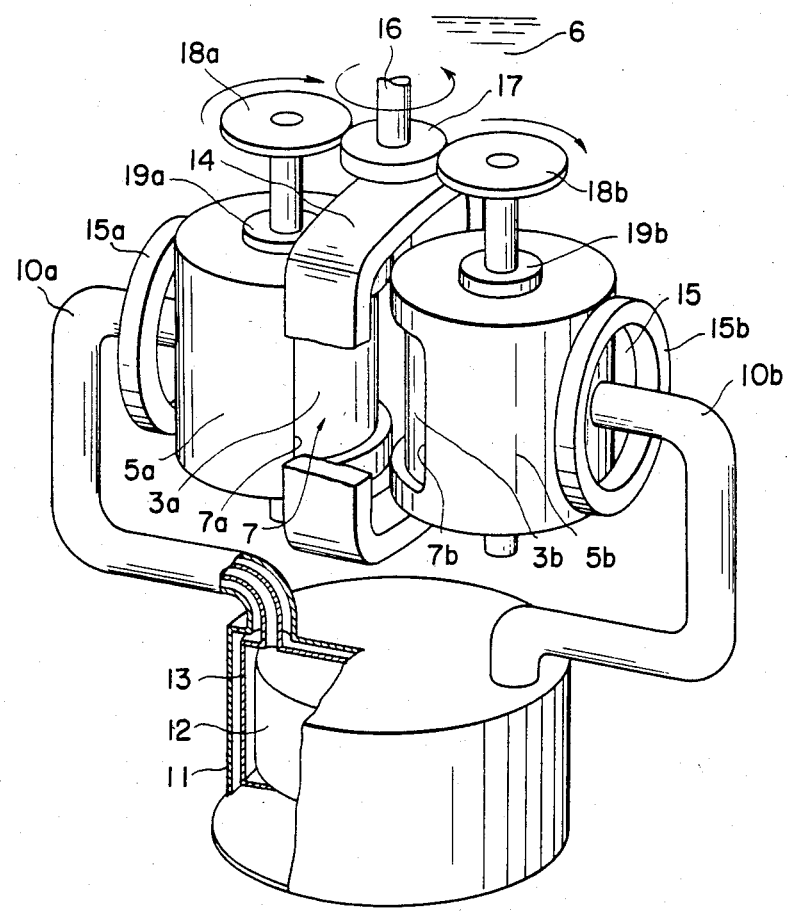
FIG. 2 is a perspective view of a rotary magnetic refrigerator according to the present invention.
Figure 3:
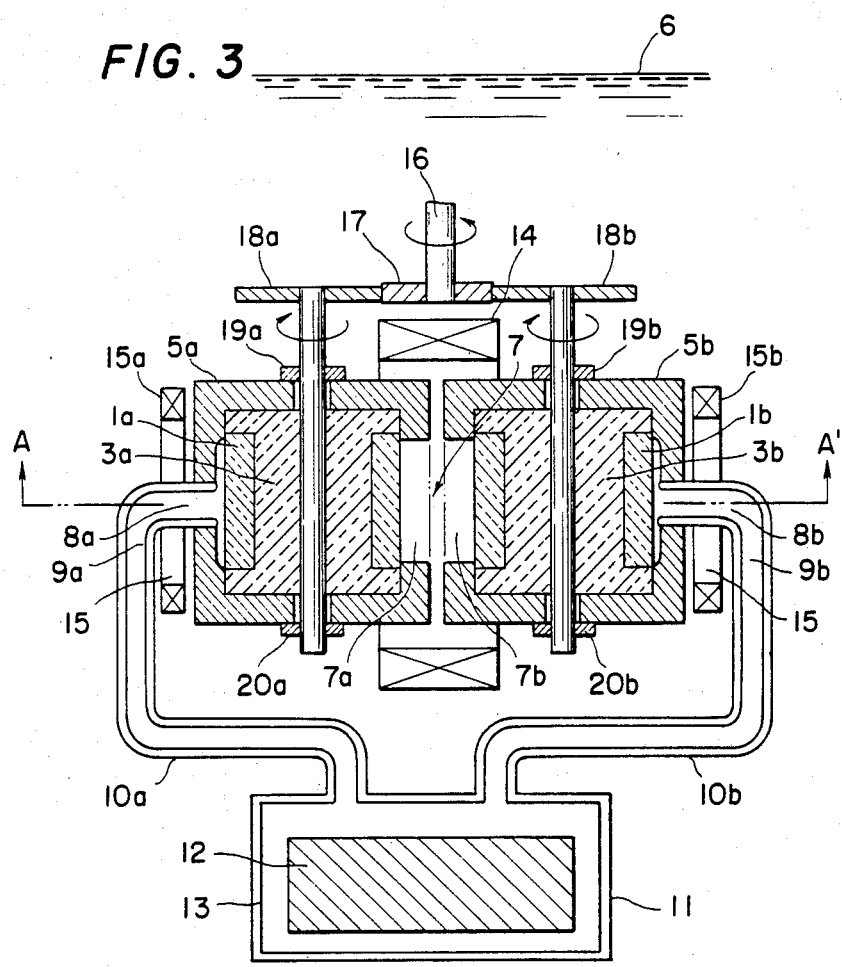
FIG. 3 is a section through the rotary magnetic refrigerator according to the present invention.
Figure 4:
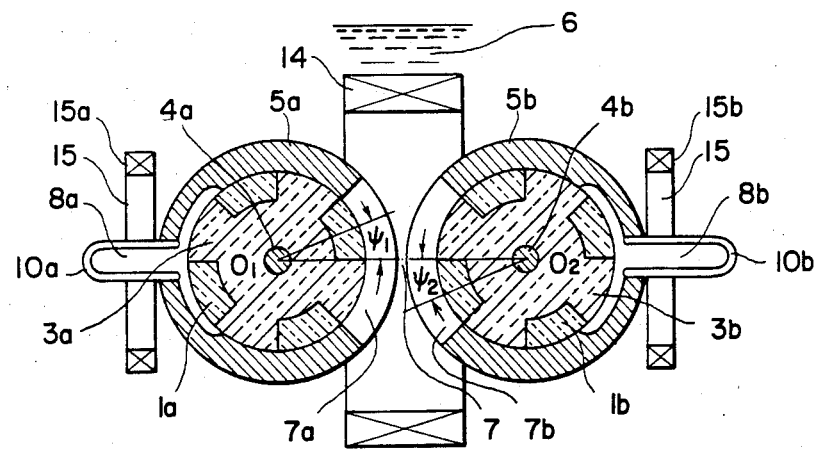
FIG. 4 is a section taken along the line A—A' of FIG. 3.

An embodiment of the present invention will be described below with reference to FIGS. 1, 2, 3 and 4. A plurality of portions of a heat-insulating cylinder 2 are filled with a working substance 1 for magnetic refrigeration, in such a manner that the outer surfaces thereof are exposed, to form a rotor 3. The working substance 1 can be a magnetic material such as $Gd_3Ga_5O_{12}$ (gadolinium gallium garnet). The cylinder 2 is made of a material such as alumina, crystallized glass, or the like which has an expansion coefficient comparable to that of the working substance, and which has a small value of heat conductivity. The exposed surfaces of the working substance 1 have the same diameter as the cylinder 2. Reference numeral 4 denotes a shaft about which the rotor 3 rotates. Two such rotors 3a, 3b are contained in cylindrical housings 5a, 5b. The working substances 1a, 1b packed in the rotors 3a, 3b are arranged with their phases offset, as shown in FIG. 4. In the example of FIG. 4, phases of the working substances are offset by $\delta_1$ and $\delta_2$ relative to the line connecting centers $O_1$, $O_2$ of the shafts 4a, 4b, where $\delta_1 + \delta_2 = 45°$. When the working substance fills six portions, $\delta_1 + \delta_2$ is approximately 30°. The inner diameter of the cylindrical housings 5a, 5b is 10 to 100 μm larger than the outer diameter of the rotors 3a, 3b. The cylindrical housings 5a, 5b are made of a material which has a small value of heat conductivity, and which has an expansion coefficient comparable to that of the rotor material. Openings 7a, 7b are so formed that the working substances 1a, 1b of the rotors 3a, 3b are able to come into contact with ordinary liquid helium 6 (at 4.2 K., 1 atm) surrounding them. The cylindrical housings 5a, 5b are so disposed that the openings 7a, 7b face each other, and are also provided with cooling chambers 8a, 8b at positions virtually symmetrical to the openings 7a, 7b. The cooling chambers 8a, 8b are filled with superfluid helium 9a, 9b (at 2.2 K. or lower, 1 atm) which acts as a low-temperature cooling medium. The superfluid helium 9a, 9b is able to communicate, via heat-insulating tubes 10a, 10b, with a cooling chamber 11 which is thermally insulated by a vacuum. In the cooling chamber 11, a material 12 to be cooled is immersed in the superfluid helium 13.

A main superconductive coil 14 is arranged so as to apply an intense magnetic field to the working substances 1a, 1b in the rotors 3a, 3b facing the openings 7a, 7b. In this case, a magnetic field (intense magnetic field 7) generated by the main superconducting coil 14 is applied to the working substances 1a, 1b in the rotors facing the cooling chambers 8a, 8b. Superconducting compensation coils 15a, 15b generate a magnetic field in the direction opposite to that of the intense magnetic field 7, so that a low magnetic field 15 is applied to the proximity of working substances 1a, 1b in the rotors facing the cooling chambers 8a, 8b. In this way, the working substances 1a, 1b in the intense magnetic field 7 are able to come into direct contact with the liquid helium 6 acting as the high-temperature cooling medium through the openings 7a, 7b, and the working substances 1a, 1b in the low magnetic field 15 are able to come into direct contact with the superfluid helium 9a, 9b acting as the low-temperature cooling medium in the cooling chambers. Under conditions in which the magnetic field is distributed as described above, the rotors 3a, 3b are driven by a motor (not shown) positioned in a room temperature portion (300 K.), via a drive shaft 16 and gears 17, 18.

The rotors are supported by bearings 19a, 19b, 20a, and 20b and rotate in the cylindrical housings 5a, 5b in a non-contact manner, maintaining a small gap therebetween which is filled with liquid helium 6. As the rotors 3a, 3b rotate, the working substances packed into the cylinders alternately pass through the intense magnetic field portion 7 and the low magnetic field portion 15.

It is desirable to increase the number of portions containing the working substance to, for example, 12 to 36 per rotor, from the standpoint of reducing variations in the driving force required and also reducing the absolute value of the driving force required. In this case, the members with the small heat conductivity disposed between the neighboring working substances should be at a distance of between 5 to 30 mm to reduce the thermal losses due to the heat transfer.

The rotors 3a, 3b may be rotated in the same direction when there are a large number of working substance portions. When the number of working substance portions is small, however, the rotors should be roated in opposite directions relative to each other. That is, when the number of working substance portions is small, the working substance is attracted by the magnetic field with a relatively large force. By rotating the rotors in the opposite directions to cancel the attractive force, variations in the torque required for driving the rotors can be reduced.

The working substance should be rotated at a frequency f of between about 0.1 to 1 Hz.

The working substance generates heat in the high magnetic field 7 and releases the heat to the liquid helium 6. In the low magnetic field 15, the temperature of the working substance drops so that it absorbs the heat from the superfluid helium 9a, 9b. By continuously rotating the rotors, the working substance releases heat and absorbs heat repetitively. That is, the heat the heat generated by the material 12 being cooled is absorbed through the superfluid helium 13, 9a, 9b, so that the material 12 being cooled is maintained at a low temperature.

In the foregoing description, liquid helium (at about 4.2 K., 1 atm) was specified for use as the high-temperature cooling medium used to produce superfluid helium (at about 2.2 K. or lower) on the low-temperature side. However, the low-temperature side can be maintained at a temperature at least below the temperature of the high-temperature cooling medium, so that superfluid helium need not necessarily be produced on the low-temperature side.

The rotors may also be contained in two cylindrical portions that are positioned in a single housing.

We claim:

1. In a rotary magnetic refrigerator comprising rotors which are packed with portions of a working substance at equal spacing along the outer circumference thereof, and which are made of a material having a low thermal conductivity, openings that are formed in the outer surfaces of said rotors so as to communicate with a high-temperature cooling medium, housings having cooling portions provided on sides thereof opposite to said openings, means which establishes an intense magnetic field near said openings and which establishes a weak magnetic field near said cooling portions, and means for driving said rotors, a rotary magnetic refrigerator characterized in comprising:

two of such rotors;

housings having openings which are formed in common for said two rotors, and cooling portions which are formed independently with respect to said rotors;

single electromagnet means for establishing an intense magnetic field near said openings;

means for establishing a weak magnetic field near said cooling portions; and drive means for rotating said two rotors in synchronism with each other.

2. The rotary magnetic refrigerator according to claim 1 wherein the positions of said portions of working substances in said two rotors are so determined that the phases thereof are offset between said two rotors when said working substances approach said intense magnetic field.

* * * * *